United States Patent
Bae (10) Patent No.: US 10,091,136 B2
(45) Date of Patent: Oct. 2, 2018

(54) ON-CHIP NETWORK DEVICE CAPABLE OF NETWORKING IN DUAL SWITCHING NETWORK MODES AND OPERATION METHOD THEREOF

(71) Applicant: Electronics and Telecommunications Research Institute, Daejeon (KR)

(72) Inventor: Young Hwan Bae, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 2 days.

(21) Appl. No.: 15/462,638

(22) Filed: Mar. 17, 2017

(65) Prior Publication Data

US 2017/0289064 A1    Oct. 5, 2017

(30) Foreign Application Priority Data

Apr. 1, 2016 (KR) .................. 10-2016-0040350

(51) Int. Cl.
*H04L 12/28*  (2006.01)
*H04L 12/933*  (2013.01)
*H04L 12/44*  (2006.01)

(52) U.S. Cl.
CPC ............ *H04L 49/109* (2013.01); *H04L 12/44* (2013.01); *H04L 49/101* (2013.01)

(58) Field of Classification Search
CPC ..... H04L 49/109; H04L 12/44; H09L 49/101; H04W 36/14; H04W 36/0022; H04W 36/385; H04W 76/04; H04W 88/06; H04W 88/16; H04W 28/16; H04W 76/00; H04W 80/10; H04W 88/18; H04W 8/02; H04W 92/02
See application file for complete search history.

(56) References Cited

U.S. PATENT DOCUMENTS

| | | | |
|---|---|---|---|
| 4,710,918 A * | 12/1987 | Miyao ............... | H04L 12/40169 370/448 |
| 7,916,720 B2 | 3/2011 | Han et al. | |
| 8,316,171 B2 | 11/2012 | Boucard et al. | |
| 2005/0135398 A1* | 6/2005 | Muthukrishnan ....... | H04L 47/24 370/428 |
| 2008/0205386 A1* | 8/2008 | Purnadi ................. | H04W 48/18 370/389 |
| 2008/0205413 A1* | 8/2008 | Purnadi ............. | H04W 36/0022 370/401 |
| 2010/0161793 A1 | 6/2010 | Hwan et al. | |
| 2011/0022754 A1* | 1/2011 | Cidon ................. | G06F 15/7825 710/107 |
| 2011/0085550 A1 | 4/2011 | Lecler et al. | |

(Continued)

FOREIGN PATENT DOCUMENTS

| KR | 10-2007-0061307 A | 6/2007 |
|---|---|---|
| KR | 10-2008-0030330 A | 4/2008 |
| KR | 10-1210273 B1 | 12/2012 |

*Primary Examiner* — Minh-Trang Nguyen (57) ABSTRACT

Provided is an on-chip network device which basically operates in a packet switching network mode, establishes an exclusive communication path according to a request for a specific path, performs networking in a circuit switching network mode, and switches a network mode back to the packet switching network mode, when communication in the circuit switching network mode is terminated.

6 Claims, 12 Drawing Sheets

(56) References Cited

U.S. PATENT DOCUMENTS

2015/0220470 A1* 8/2015 Chen .................... H04L 49/109
                                                710/105
2015/0236870 A1* 8/2015 Lee ..................... G06F 13/1689
                                                370/257

* cited by examiner

ON-CHIP NETWORK DEVICE CAPABLE OF NETWORKING IN DUAL SWITCHING NETWORK MODES AND OPERATION METHOD THEREOF

CROSS-REFERENCE TO RELATED APPLICATIONS

This U.S. non-provisional patent application claims priority under 35 U.S.C. § 119 of Korean Patent Application No. 10-2016-0040350, filed on Apr. 1, 2016, the entire contents of which are hereby incorporated by reference.

BACKGROUND

The present disclosure herein relates to on-chip networking and more particularly, to an on-chip network device capable of switching from a packet switching network mode to a circuit switching network mode and an operation method thereof.

In a system-on-chip (SoC) design method, platform-based design is emphasized which enables an SoC for a multi-product system to be developed in a short time period. The core of the platform-based design is a processor and a data communication structure. As the number of elements integrated in an SoC increases, an amount of data transmitted and received between processing modules rapidly increases. Accordingly it becomes more difficult to design the communication structure. To meet SoC design in which various processor cores, memories, and IPs are integrated into one chip, an on-chip communication structure is required to have high scalability and reusability.

A typical on-chip network structure is designed to support only one of a circuit switching network and a packet switching network with any one of efficiency and quality of service (QoS) focused.

SUMMARY

The present disclosure provides an on-chip network device capable of switching from a packet switching network mode to a circuit switching network mode and an operation method thereof.

An embodiment of the inventive concept provides an operation method of an on-chip network device, the operation method including: performing, by an on-chip network device, data communication switching networking in a first switching network mode; performing, by the on-chip network device, data communication switching networking temporarily in a second switching network mode that is different from the first switching network mode, when there is a path switching request in a specific communication path; and switching, by the on-chip network device, a switching network mode into the first switching network mode again, when the data communication switching networking in the second switching network mode is terminated.

In an embodiments of the inventive concept, an on-chip network device includes: first and second network interfaces configured to receive a control signal and data to generate a packet and/or analyze an applied packet, and deliver the packet; a first crossbar switch connected between the first and second network interfaces and configured to route the packet to a path of a first direction; and a second crossbar switch connected between the first and second interfaces and configured to route the packet to a path of a second direction that is opposite to the first direction, wherein the first and second network interfaces and the first and second crossbar switches perform data communication switching networking in a packet switching mode, when a circuit switching enable signal is inactivated, and temporarily perform data switching networking in a circuit switching networking mode in which a network protocol is different from that of the packet switching network mode, when the circuit switching enable signal is activated.

In an embodiments of the inventive concept, an operation method of an on-chip network device includes: performing, by an on-chip network device, data communication switching networking in a packet switching network mode; performing, by the on-chip network device, data communication switching networking temporarily in a circuit switching network mode that is different from the packet switching network mode, when a circuit switching enable signal is received from a specific communication path; and switching, by the on-chip network device, a switching network mode into the packet switching network mode again, when data communication switching networking in the circuit switching network mode is terminated.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, exemplary embodiments of the inventive concept will be described in detail with reference to the accompanying drawings. The following descriptions will be made focusing on configurations necessary for understanding embodiments of the inventive concept. Therefore, descriptions of other configurations that might obscure the gist of the disclosure will be omitted.

Figure 1:
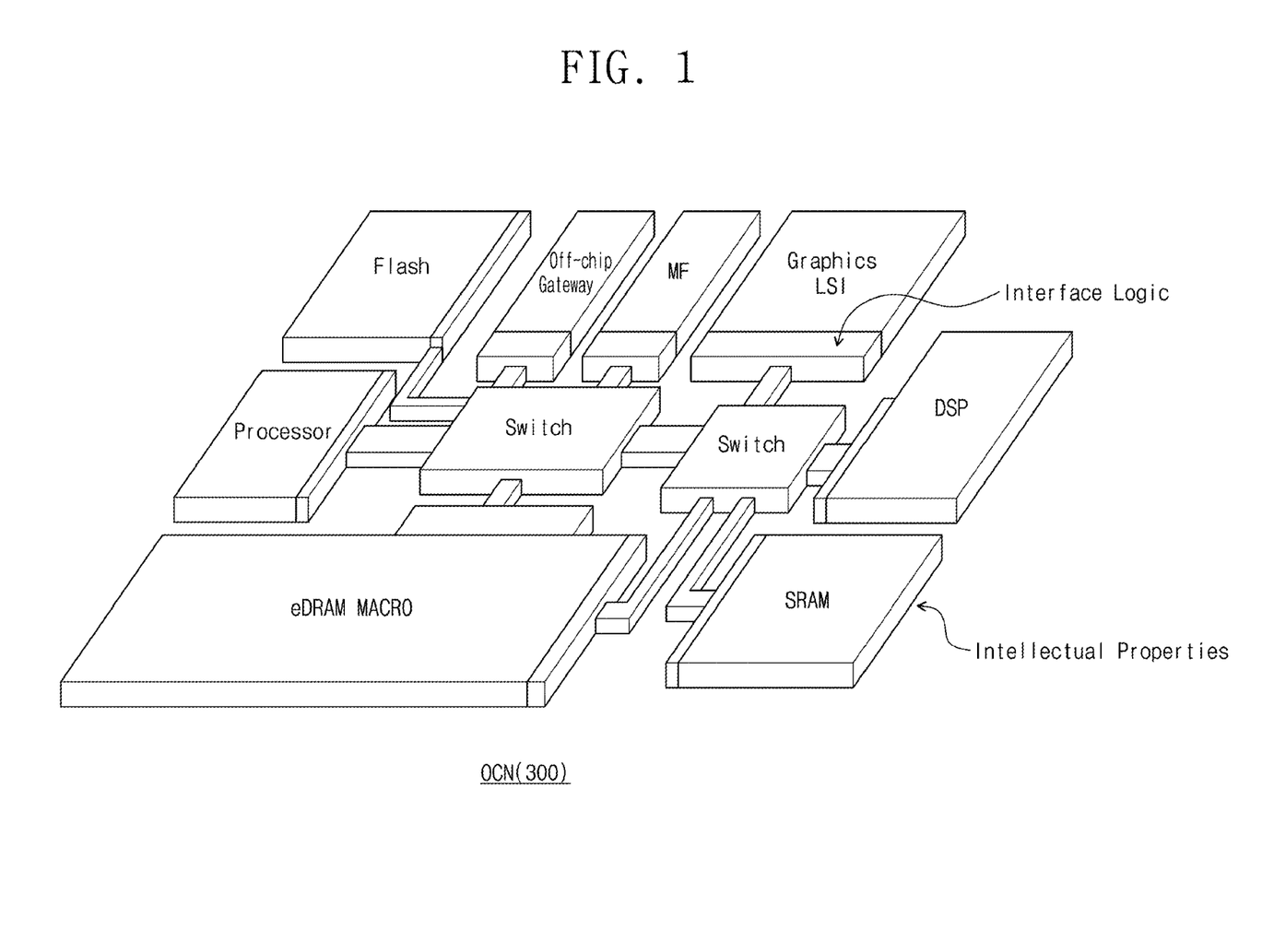
FIG. 1 is a view for explaining a communication connection structure of a typical on-chip network.

FIG. 1 is a view for explaining a communication connection structure of a typical on-chip network. The on-chip network 300 is an application of computer network technology on a chip according to a requirement of an on-chip communication structure. In FIG. 1, an on-chip network structure configured of a plurality of routing switches has topology types of star, 2-dimensional mesh, hypercube, tree, or torus. One of various types may be properly selected according to data traffics of an application field. At the time of system design, an on-chip network structure in which various settings are supported is preferred in order to ensure a bandwidth, latency, quality of service (QoS), and the like required in various application fields. In addition, support capability of scalability, flexibility, and performance improvement may also be main factors for a selection of an on-chip network structure type.

A star type on-chip network is frequently used in the present field, since it may perform efficient communication in reflection of local communication characteristics of application design, be designed in accordance with a specialized topology, and may allocate a communication resource in a bandwidth proper to each communication requirement.

A communication protocol of an on-chip network is largely divided into a circuit switching network and a packet switching network. The circuit switching network is a method in which a communication link on a communication path between both communication terminals is exclusively secured and communication is performed therethrough, and the packet switching network is a method in which communication data is made in a packet format and the packet is transmitted through a network shared among various communication subjects.

In a star type on-chip network based on a packet switching network that is proper to large size SoC design, since various communication requirements may share the network without monopolization of a communication resource, efficiency of the network entirely gets higher. However communication quality, namely, QoS, of a specific communication requirement, which largely affects system performance, may not be ensured to influence bad effects on system performance.

In comparison to this, for a circuit switching network, since communication between both terminals is performed through an ensured communication path, communication is enabled in a maximum bandwidth and may be performed with a minimum communication delay. However, since communication resources on a communication path are exclusively used only between both terminals, efficiency of the communication resources may be entirely lowered.

A typical on-chip network structure is designed to be able to support only one of the above-described two communication protocols and to emphasize any one of efficiency and QoS of the network. Therefore it is difficult to design an optimal on-chip network structure.

Figure 2:
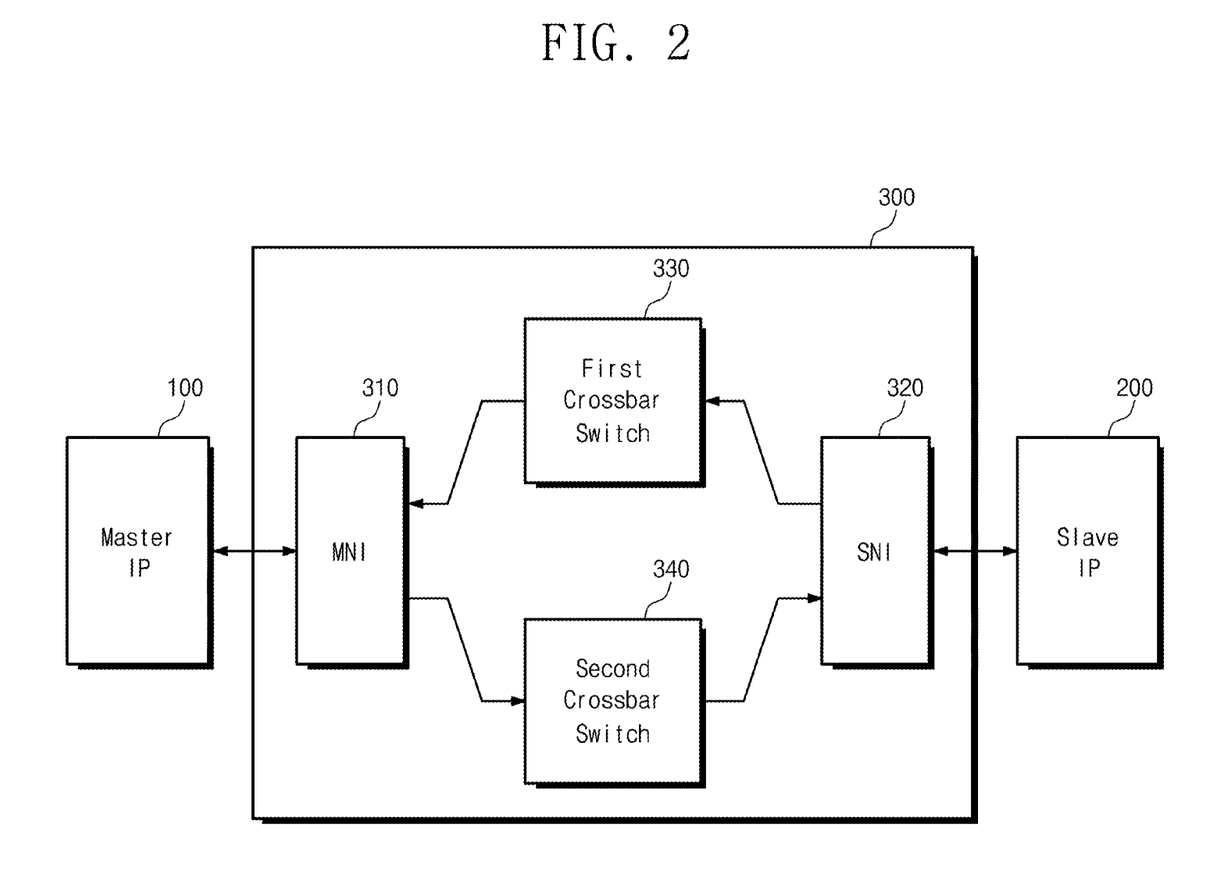
FIG. 2 is a block diagram of a typical star type on-chip network structure.

FIG. 2 is a block diagram of a typical star type on-chip network structure. Referring to FIG. 2, an on-chip network device 300 connectable between a master IP 100 and a slave IP 200 may include a master network interface (MNI) 310, a slave network interface (SNI) 320, and first and second crossbar switches 330 and 340 for packet routing.

The MNI 310 and the SNI 320 function as network interface modules. The network interface module plays a role of transmitting control signals applied from an intellectual property (IP) core (namely, master IP or slave IP) and packets in which data is packetized to corresponding crossbar switches or analyzing packets received from the crossbar switches to transfer the analyzed packets to the IP core.

The master network interface 310 has a function of being able to require, from a network, a communication transaction as a network interface connected to the master IP 100 that may be a processor, direct memory access, or the like. On the other hand, the slave network interface 320 plays a role of responding to a communication requirement from the master IP 100 and providing corresponding service as an interface connected to a slave IP 200 that may be a memory or the like. The first and second crossbar switches 330 and 340 route packets. In other words, the first and second crossbar switches 330 and 340 may connect packets entered through input ports to proper output ports according to destination addresses stored in a packet header.

Figure 3:
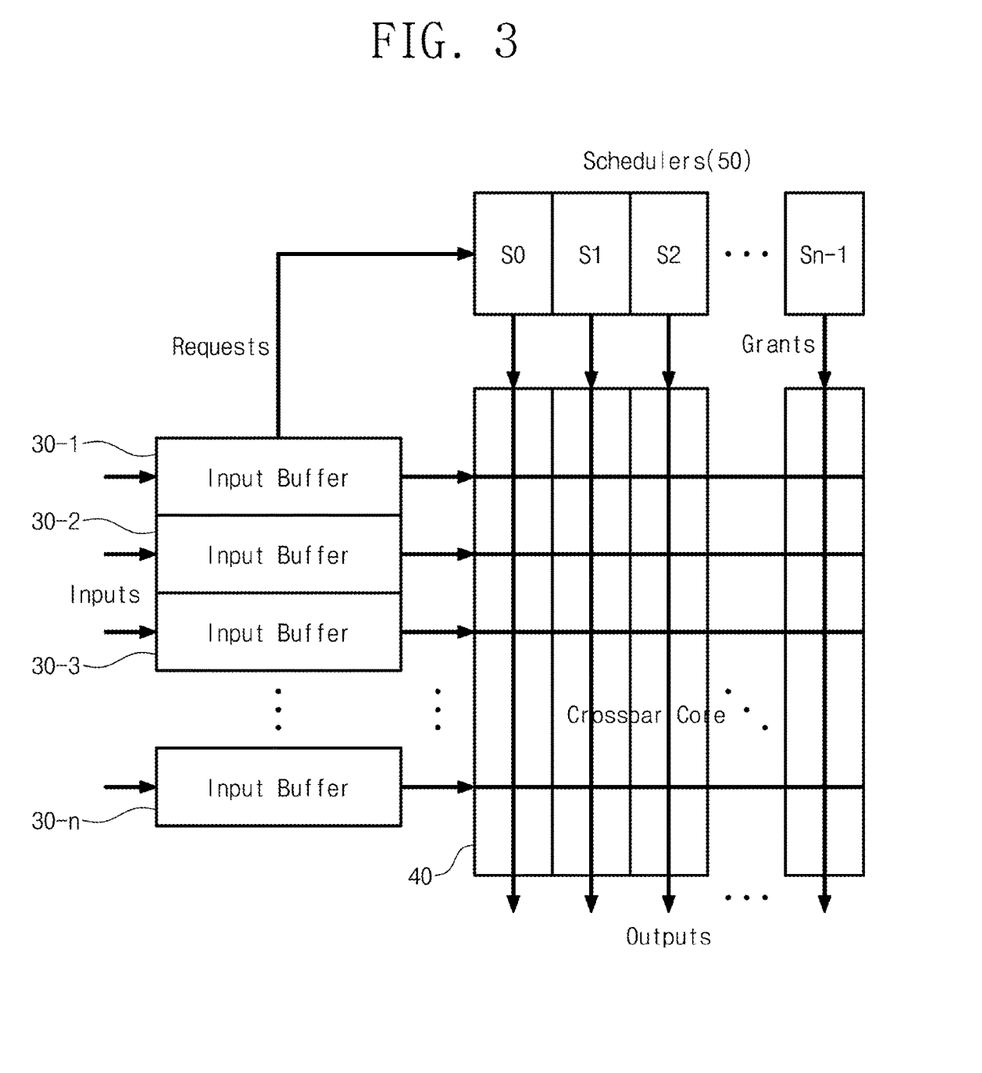
FIG. 3 is a view for explaining conceptually the crossbar switch in FIG. 2.

FIG. 3 is a view for conceptually explaining the crossbar switch in FIG. 2. In FIG. 3, only one of the first and second crossbar switches 330 and 340 is illustrated. The crossbar switch may include input buffers 30-1 to 30-$n$ having a first-in first-out (FIFO) function, a scheduler 50 for controlling each output port, and a crossbar fabric 40.

When the packet arrives at the input buffer (e.g. 30-1), the crossbar switch analyzes a header included in the packet to extract destination information indicated by the packet. The crossbar switch searches a routing table for an output port number of a current switch using the destination information. Accordingly, a request is transmitted, from the input buffer 30-1, to a scheduler 50 for controlling a corresponding output port. The scheduler 50 selects one of various requests that attempt to use an output link according to a determined priority. In addition, the scheduler 50 sends a proper control signal to the crossbar fabric 40 so that a communication path is connected from a corresponding input port to a corresponding output port, and then sends a grant signal to the selected input port. The input buffer 30-1 that corresponds to the granted input port transmits a packet through the communication path set in the crossbar fabric 40.

A cache miss may occur in a continuous massive data transmission request through a direct memory access or arithmatic process by a processor. Under such a cache miss situation, there is a case where massive data is required to be transmitted rapidly for a certain time like data communication between a cache memory and a main memory.

In a packet switching network mode, a series of processes are necessary in which each piece of data is required to be packetized in a transmission side, the packetized packet is scheduled by the scheduler of the crossbar switch, and the packet is parsed to extract necessary data in a reception side. In such a packet switching network mode, data communication switching networking has a relatively complex process and may cause a communication delay.

On the other hand, in a circuit switching network mode, only minimum necessary information is sent through an ensured communication path without a delay due to packetization and scheduling, and thus it is very efficient for a single communication request. However, since such a communication request is not constantly present, a communication resource is wasted during a time period while an exclusively ensured communication path is not used.

Accordingly, as will be described below, in an embodiment of the inventive concept, an operation of an on-chip network device is provided in which data communication switching networking is performed in a circuit switching manner (e.g. network mode) if necessary, and in other cases, data communication switching networking is performed in a packet switching manner (e.g. network mode).

According to an embodiment of the inventive concept, in the operation method of the on-chip network device, the on-chip network device performs data communication switching networking in the packet switching network mode and when a circuit switching enable signal is received from a specific communication path, the on-chip network device temporarily performs the data communication switching networking in the circuit switching mode in which a network protocol is different from that in the packet switching network mode. In addition, the operation method includes switching, by the on-chip network device, the switching network mode into the packet switching network mode again, when the data communication switching networking in the circuit switching network mode is terminated.

Figure 4:
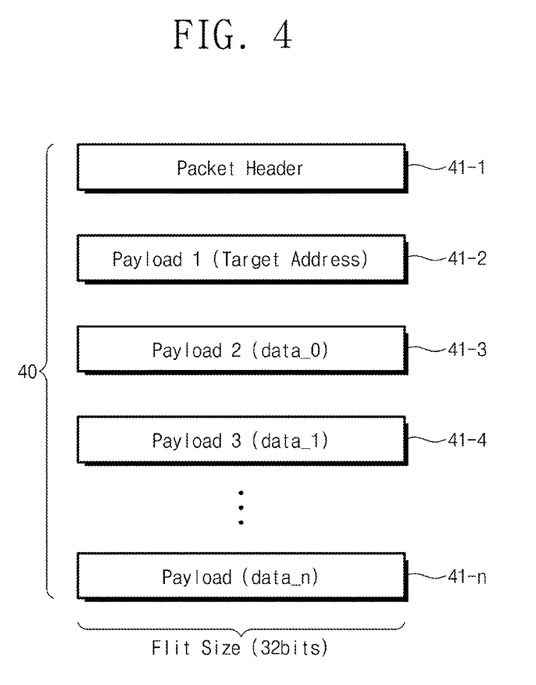
FIG. 4 is a view showing a packet format according to an embodiment of the inventive concept.

FIG. 4 is a view showing a packet format according to an embodiment of the inventive concept. Referring to FIG. 4, a format of a packet 40 is formed of a packet header 41-1 and a plurality of payloads 41-2 to 41-n. In other words, an internal configuration of the packet 40 may include a header field contained in a packet header 41-1, an address field contained in a payload 1 41-2, and data fields respectively contained in payload 2 41-2 to payload n 41-n. The header field includes packet routing information, a packet type (e.g. read/write), and a packet size, etc. The address field includes a destination address of a packet and has a 32 bit size. The data fields are formed a plurality of payloads and have a 32 bit size as a basic unit. N pieces of data may be transmitted through the payloads. The size of the data field is indicated in the header field. Each packet may be divided into the size (width of a communication link) to be transmittable in one clock and then transmitted. Communication between IP cores in the on-chip network device may be performed in the packet type as illustrated in FIG. 4. An on-chip network in an embodiment of the inventive concept basically supports the packet switching network mode.

Figure 5:
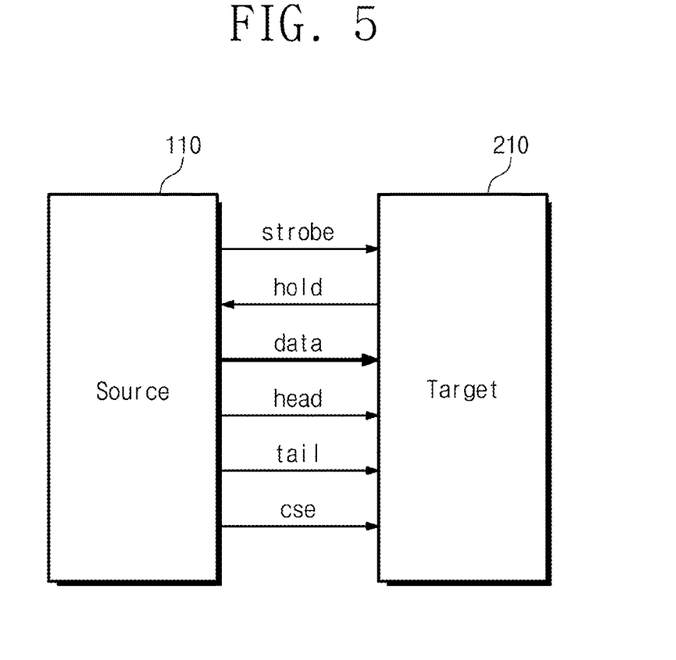
FIG. 5 is an exemplary diagram of flow control signals used in a protocol-switchable on-chip network structure according to an embodiment of the inventive concept.

FIG. 5 is an exemplary diagram of flow control signals used in a protocol-convertible on-chip network structure according to an embodiment of the present disclosure. Referring to FIG. 5, the flow control signals between a source 110 and a target 210 are shown. The flow control signals between the source 110 and the target 210 may be provided by the master network interface, the slave network interface, or the crossbar switches configuring the on-chip network device. For example, when the master network interface 310 is the source, the slave network interface 320 or the crossbar switches 340 may become the target 210.

As the flow control signals between the source 110 and the target 210, a strobe signal and a hold signal are signals for hand-shaking. First, the strobe signal is an output signal of the source 110 and a case of being '1' means that a value of a current data bus signal is valid. The hold signal is an output signal of the target 210 and a case of being '1' means that the target 210 is not prepared for receiving data. For example, the strobe signal is '1' and the hold signal is '0', data is normally transmitted from the source 110 to the target 210. When the hold signal is constantly '0', transmission of maximum performance can be achieved.

Besides the hand-shaking signal such as the strobe/hold signals, there is a head/tail signal indicating a start/end of the packet. The head signal is a signal for indicating that information transmitted through a current data bus is the start of a new packet and the tail signal is a signal for indicating the end of the new packet.

A control circuit in the crossbar switch just performs scheduling and routing of a new packet according to the head/tail signal. When the head signal is '1', the control circuit performs routing and when the tail signal is '1", the control circuit performs scheduling. Using these signals, the size of a data link can be easily changed and thus design flexibility becomes very high. In addition, the control circuit in a crossbar switch becomes simple, since it is not necessary to consider the sizes of packet and link.

The cse signal indicates a circuit switching enable signal and is a signal for setting the circuit switching path. When the cse signal is '1', the circuit switching path is set and maintained. In an embodiment of the inventive concept, when the cse signal is '1', the circuit switching path is activated and when the cse signal is '0', the circuit switching path is inactivated.

Figure 6:
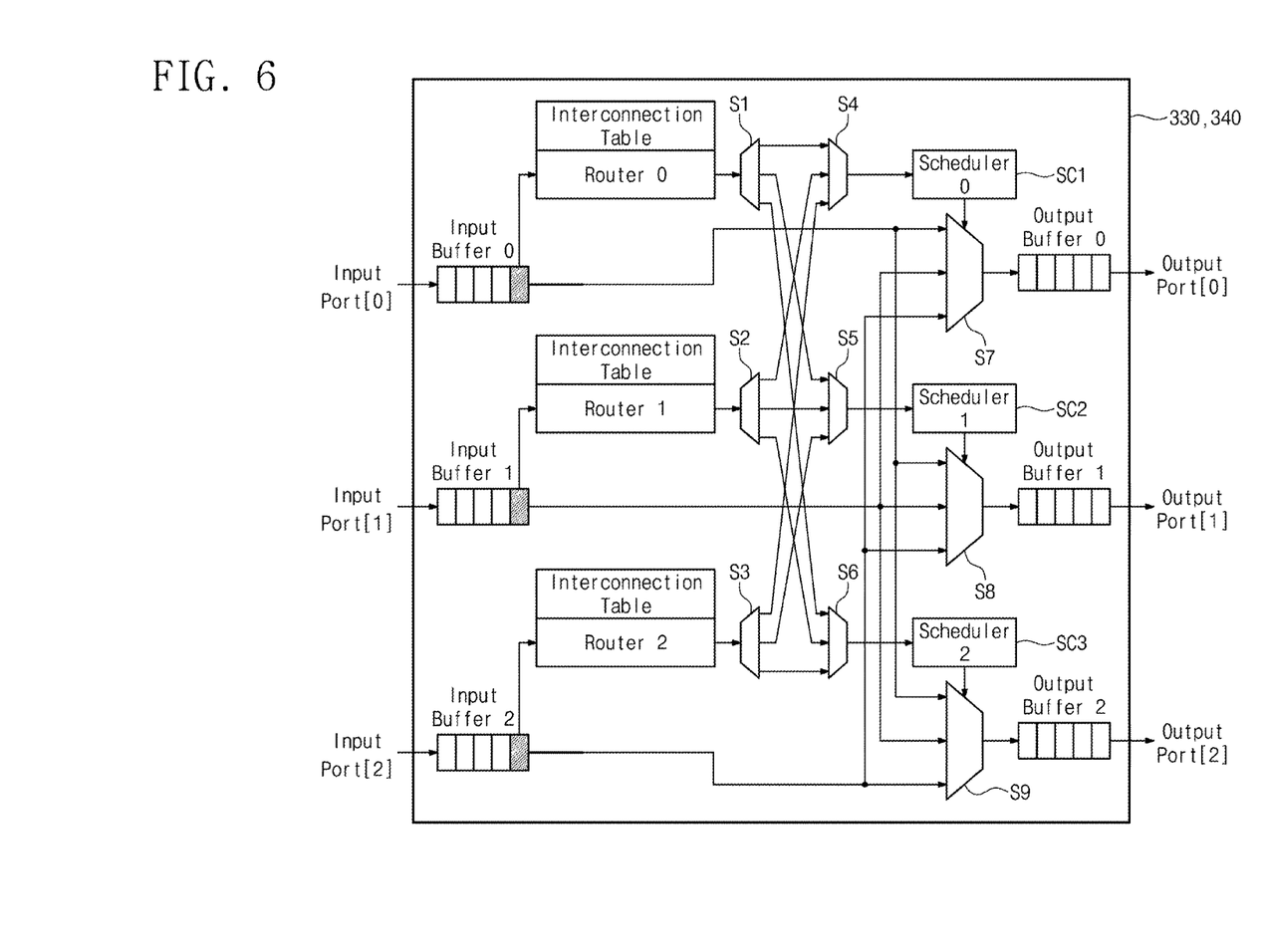
FIG. 6 is a configuration block diagram of a crossbar switch according to an embodiment of the inventive concept.

FIG. 6 is a configuration block diagram of a crossbar switch according to an embodiment of the inventive concept. A crossbar switch of FIG. 6 may correspond to the first crossbar switch 330 or the second crossbar switch 340 of FIG. 2. Referring to FIG. 6, the crossbar switch may include input/output buffers (e.g. input buffer 0 and output buffer 0) connected to respective input/output buffers, routers (e.g. router 0 and router 1) configured to control connection between the input/output buffers, routing tables, and schedulers SC1 to SC3 configured to control and select a connection request from input buffers to the output buffers.

When a packet arrives at the input buffer (e.g. input buffer 0), a control circuit (not illustrated) in the crossbar switch analyzes the header of the packet to find a destination node number. In addition, the control circuit finds the output port number connected from the current switch to the destination node from the routing table by using the found destination node number. Also the control circuit sends a request signal to the scheduler (e.g. SC1) for controlling the corresponding output port (e.g. output port 0). The scheduler (e.g. SC1) selects one of various request signals according to a given priority order and sends a grant signal to the selected input port (e.g. input port 0). In addition, the scheduler (e.g. SC1) sends a proper selection signal to the multiplexing (hereinafter mux) circuit S7 in which a crossbar fabric is implemented such that a communication path is connected from the selected input port (input port 0) to the output port (output port 0). Accordingly, a packet may be transmitted to the output buffer (e.g. output buffer 0) of the corresponding output port through the mux circuit S7. A scheme that each scheduler selects an input may be one of the selection manners such as a round-robin, a oldest-first (FIFO) and a packet priority.

In an embodiment of the inventive concept, a static source routing algorithm is supported. Accordingly, in a step of on-chip network design, paths between network interfaces and crossbar switches are determined in advance. In addition, the paths determined in advance may be stored in each routing table in FIG. 6. The control circuit of the crossbar switch may extract an output port number from the corresponding routing table using a node number of the target network interface, which is included in a packet header, in order to perform routing.

Figure 7:
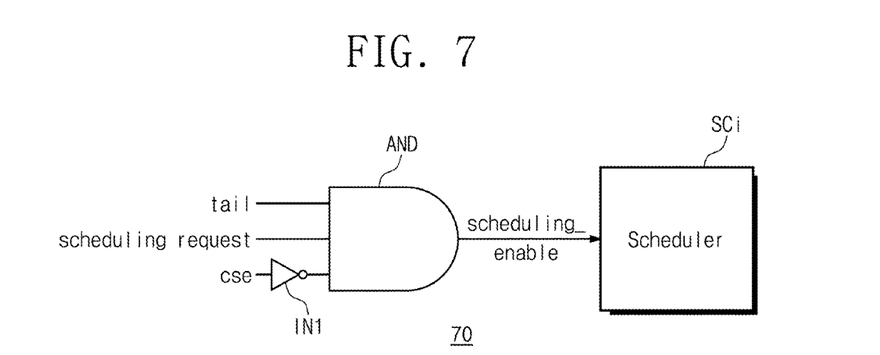
FIG. 7 is a circuit diagram of scheduling enable signal generation according to an embodiment of the inventive concept.

When the cse signal is activated and an operation is performed in the circuit switching network mode, the scheduler (e.g. SC1 of FIG. 6) in the crossbar switch maintains a circuit switching path according to the scheduling signal generated as in FIG. 7.

FIG. 7 is a circuit diagram for generating a scheduling signal according to an embodiment of the inventive concept.

Referring to FIG. 7, a scheduling signal generation circuit 70 includes an AND gate and an inverter IN1 configured to invert the cse signal.

Accordingly, even though the scheduling request signal and the tail signal are applied as '1', when the cse signal is applied as '1', the AND gate outputs a scheduling disable signal. Accordingly, the scheduler SCi of FIG. 7 does not perform scheduling for establishing a new communication path but maintains an existing path to ensure the circuit switching path.

Figure 8:
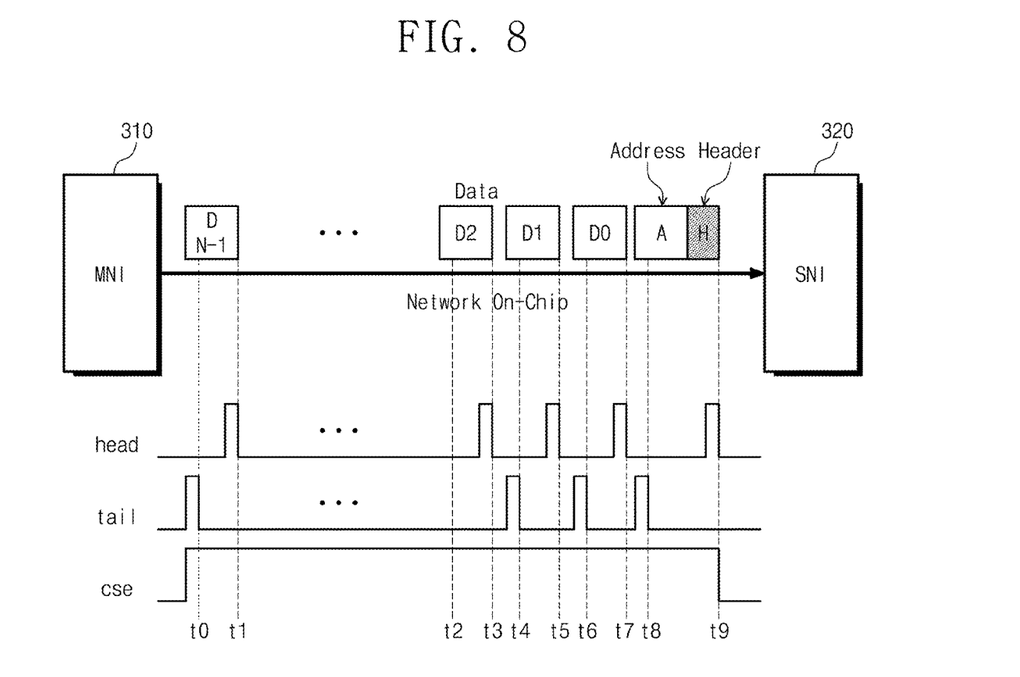
FIG. 8 is an exemplary circuit switching transmission method according to an embodiment of the inventive concept.

FIG. 8 is an exemplary circuit switching transmission method according to an embodiment of the inventive concept. Referring to FIG. 8, transmission of a packet between the MNI 310 and the SNI 320 in the circuit switching network mode is exemplarily illustrated. The packet may be configured with data formed of a header, an address, and a plurality of payloads.

In this case, as described in relation to FIG. 5, as the flow control signals between the source and the target, waveforms of a head signal, a tail signal, and a circuit switching enable signal cse, and a transmission operation timing appear as shown in FIG. 8. Since time point t9 is earlier than time point t0 as illustrated on a time axis, when a head signal of a high pulse and a circuit switching enable signal transitioned to a high level are applied at time point t9, the packet is transmitted in the circuit switching network mode. Transmission in the circuit switching network mode is terminated, when a tail signal transitioned to a high pulse and a circuit switching enable signal transitioned to a low level is applied after time point t0.

Consequently, the router and scheduler in the crossbar switch of FIG. 6 perform scheduling and routing according to the head signal/tail signal applied to an input port. When a head signal of a packet currently being processed is '1' in the input buffer (e.g. input buffer 0), the router (e.g. router 0) performs routing. When a tail signal of a packet delivered to the output buffer (e.g. output buffer 0) is '1', the scheduler SC1 of the corresponding output buffer (e.g. output port 0) performs scheduling for selecting a new input port.

Figure 9:
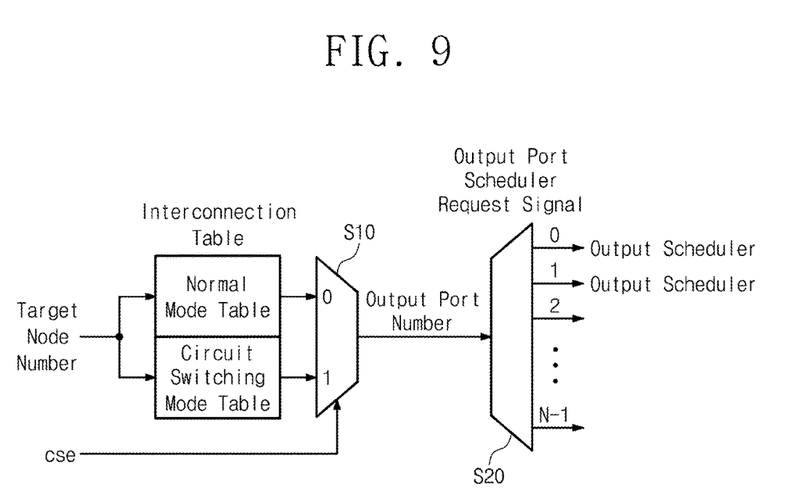
FIG. 9 is a diagram for a routing table structure according to an embodiment of the inventive concept.

FIG. 9 is a diagram of a routing table structure according to an embodiment of the inventive concept. Referring to FIG. 9, the routing table is configured with a normal mode table and a circuit switching mode table.

At the moment of the cse signal changing form '0' to '1', the router in the crossbar switch searches a current packet for a destination node number to find an output port of packet destination through the routing table. When packet transmission currently being performed in the corresponding output port is terminated, a communication path for packet transmission in the circuit switching network mode is established to a switch connected the output port in a highest priority. In addition, the circuit switching path to the final destination may be established by repeating the process for transmitting the cse signal to the next crossbar switch.

Figure 10:
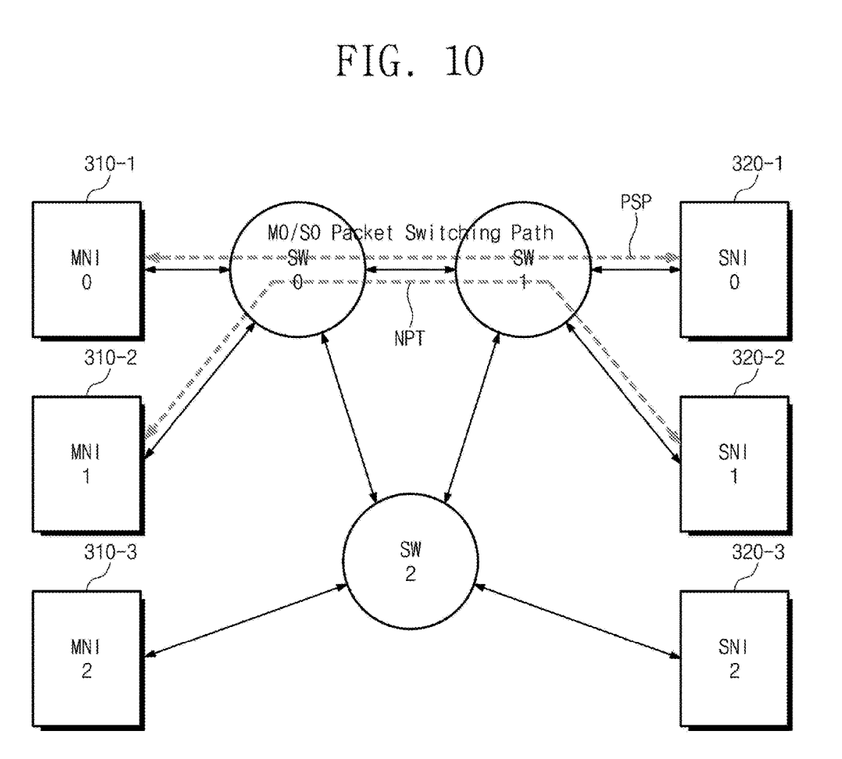
FIG. 10 is a view showing a communication path in a packet switching network mode according to an embodiment of the inventive concept.
Figure 11:
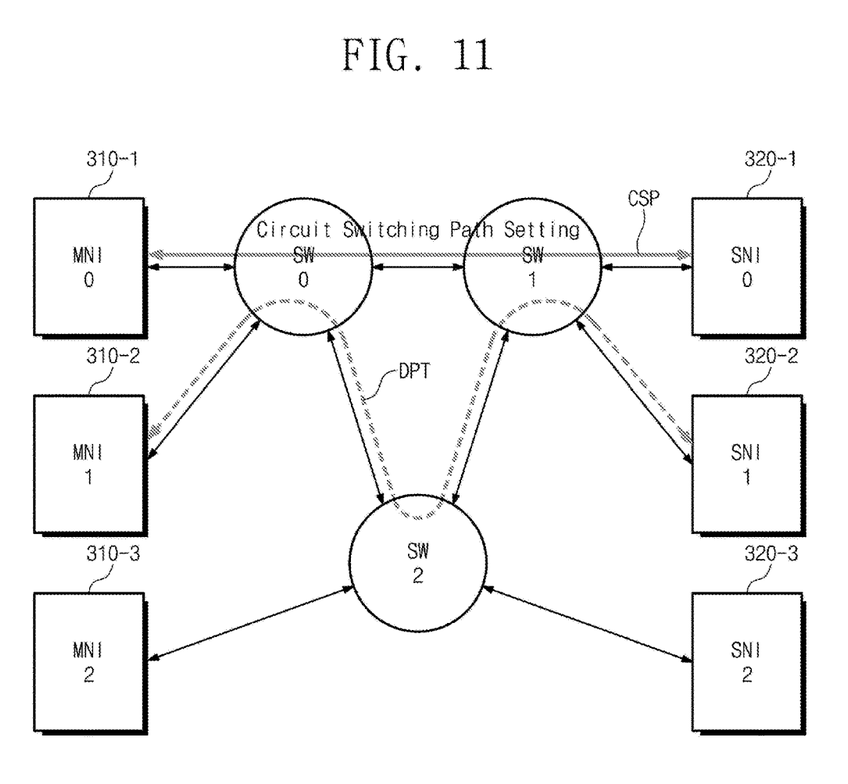
FIG. 11 is a view showing a detour communication path by circuit switching path setting according to an embodiment of the inventive concept.

When the cse signal is '0' (inactivated state), the normal mode table is referred and packet transmission is performed in the packet switching network mode as FIG. 10. On the other hand, when the cse signal is '1', a detour communication path by the circuit switching path establishment is formed as shown in FIG. 11. FIG. 10 is a view showing a communication path in a packet switching network mode according to an embodiment of the inventive concept, and FIG. 11 is a view showing a detour communication path by circuit switching path setting according to an embodiment of the inventive concept.

First, referring to FIG. 10, a switch SW0 and a switch SW1 form a packet switching path to perform switching between MNI0 310-1 and SNI0 320-1. In addition, the switch SW0 and the switch SW1 form another packet switching path to perform switching between MNI1 310-2 and SNI1 320-2.

In the path forming state as shown in FIG. 10, when '1' is applied to cse pins (not illustrated) of the switches SW0 and SW1, a circuit switching path CSP between MNI0 310-1 and SNI0 320-1 is established as shown in FIG. 11. Such a path conversion has illustrated in relation to FIG. 9. The circuit switching path CSP, namely, when the data communication switching networking is switched to the circuit switching network mode, other interconnection paths besides the circuit switching path CSP exclusively formed between MNI0 310-1 and SNI0 320-1 are switched to detour paths set in a circuit switching mode table in the routing table of FIG. 9. For example, a detour path DPT is formed between MNI1 310-2 and SNI2 320-2 as shown in FIG. 11. Consequently, since the path between MNI1 310-2 and SNI1 320-2 is a path formed in the packet switching mode, the path is switched to the detour path DPT in order not to pass the circuit switching path CSP. In this way, an on-chip network designer may establish the detour path as shown in FIG. 11 in advance at the time of design. Although the detour path is established in advance in the embodiment, a person skilled in the art may understand that the detour path may be immediately established at the time of event occurrence by a conversion algorithm.

A format of a packet transmitted in the circuit switching mode includes only minimum control information unlike the case of the packet switching mode. Accordingly, since the packet has a relatively simple format, generation and analysis of the packet are relatively simple.

Figure 12:
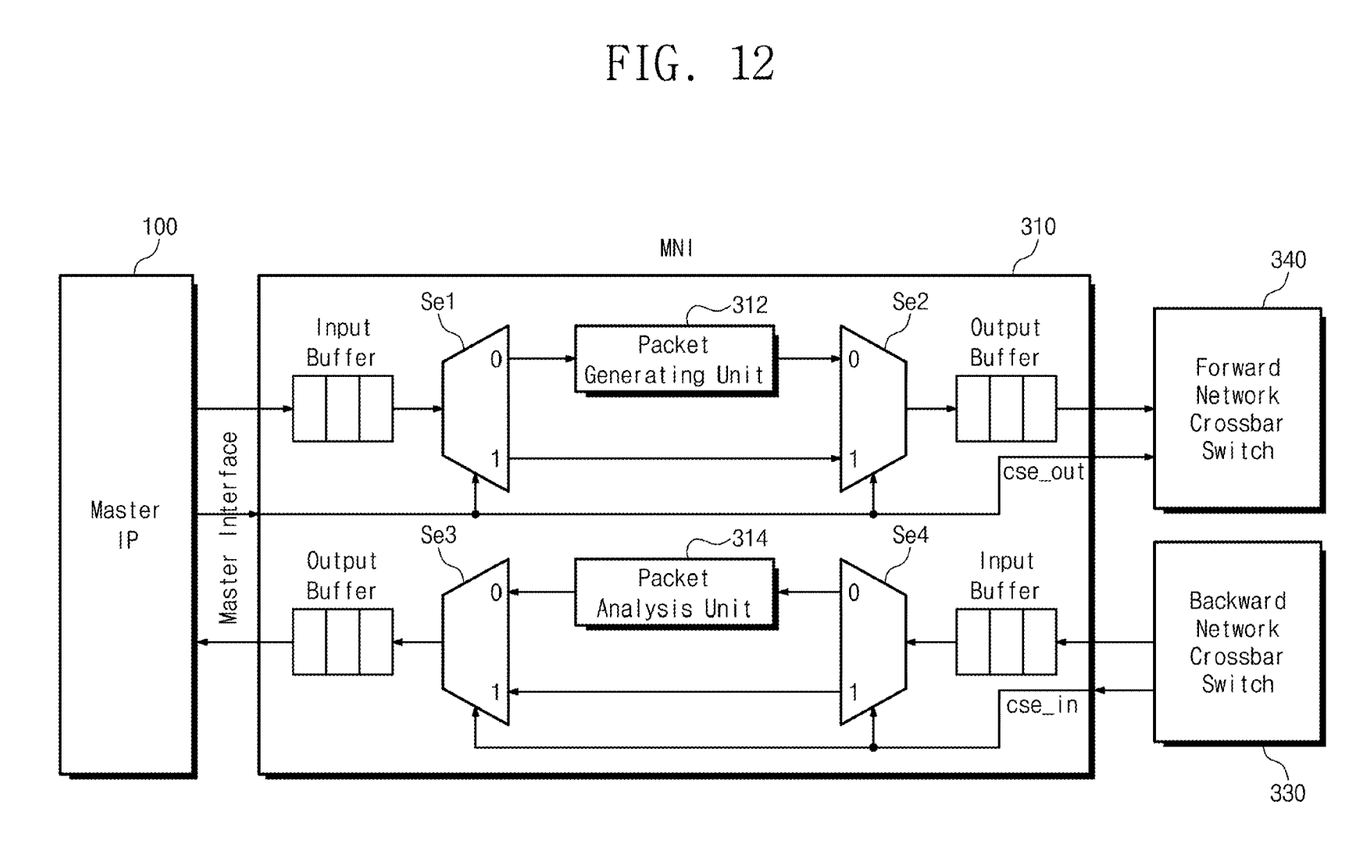
FIG. 12 is a configuration block diagram of a master network interface according to an embodiment of the inventive concept.
Figure 13:
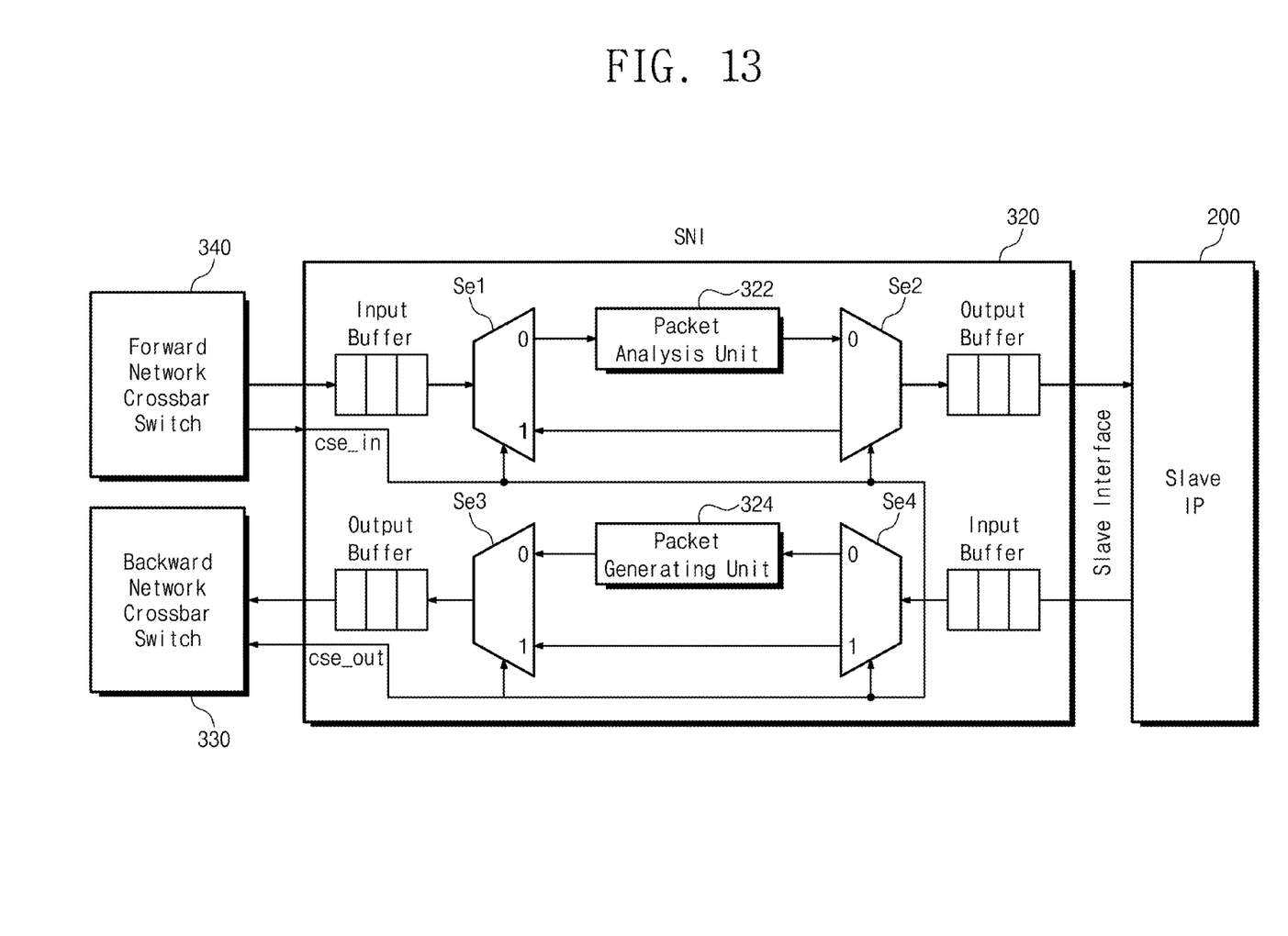
FIG. 13 is a configuration block diagram of a slave network interface according to an embodiment of the inventive concept.

FIG. 12 is a configuration block diagram of a master network interface according to an embodiment of the inventive concept and FIG. 13 is a configuration block diagram of a slave network interface according to an embodiment of the inventive concept.

First, referring to FIG. 12, a mater network interface 310 may include input/output buffers, selectors se1 to se4, a packet generation unit 312, and a packet analysis unit 314. Selection control signal of the selectors se1 and se2 are a circuit switching enable signals cse given by the master IP 100. On the other hand, selection control signals of the selectors se3 and se4 are the cse signals provided through a backward crossbar switch 330.

When the cse signals are applied to the master network interface 310, the switching mode is switched to a circuit switching mode from the packet switching mode and the packet generation unit 312 or the packet analysis unit 314 does not generate the packet or analyze the packet. For example, since a packet input through an input buffer is provided to an input terminal 1 of the selector se2 through an output terminal 1 of the selector se1, a packet generation process for the input packet by the packet generation unit 312 is omitted. In addition, since a packet input through an input buffer connected to the backward network crossbar switch 330 is provided to an input terminal 1 of the selector se3 through an output terminal 1 of the selector se4, a packet analysis process for the input packet by the packet analysis unit 314 is omitted. In this way, when conversion to the circuit switching transmission mode is performed, a packet having only simple control information is transferred in a high speed without going through the packet generation/analysis process of the existing packet switching mode.

Referring to FIG. 13, a slave network interface 320 may include input/output buffers, selectors se1 to se4, a packet generation unit 322, and a packet analysis unit 324. Selection control signals of the selectors se1 to se4 may be the cse signals given by a forward direction network crossbar switch 340.

Similarly to FIG. 12, when the cse signals are applied to the slave network interface 320, the switching mode is switched to a circuit switching mode from the packet switching mode and the packet generation unit 322 or the packet analysis unit 324 does not generate the packet or analyze the packet. For example, since a packet input through an input buffer connected to the slave IP 200 is provided to an input terminal 1 of a selector se4 through an output terminal 1 of a selector se3, a packet generation process for the input packet by the packet generation unit 322 is omitted. In addition, since a packet input through an input buffer connected to the forward direction network crossbar switch 340 is provided to an input terminal 1 of the selector se2 through an output terminal 1 of the selector se1, a packet analysis process for the input packet by the packet analysis unit 324 is omitted. In this way, when conversion to the circuit switching transmission mode is also performed in the slave network interface 320, a packet having only simple control information is transferred in a high speed without going through the packet generation/analysis process of the existing packet switching mode.

On the other hand, when selectors or circuit modules are installed in all of a plurality of master network interfaces, a plurality of slave network interfaces, and a plurality of crossbar switches, a hardware cost may increase. Therefore, in an on-chip network design step, master and slave interfaces for which conversion to the circuit switching mode is necessary and crossbar switches on these paths may be selectively determined in advance. In addition, even for the crossbar switches, specific input/output ports and a router/scheduler related thereto may also be selectively designated in order to minimize or reduce the hardware cost.

As described above, for efficiency of the entire network, the packet switching network mode is determined as a basic communication mode. When there is a massive data transmission request that affects system performance, the packet switching network mode is switched to the circuit switching mode. Accordingly, an overhead due to packetization and scheduling may be minimized or reduced and packet transmission in a maximum transmission speed may be realized. Therefore, communication QoS is ensured and entirely high performance on-chip network capable of efficient communication is implemented.

According to an embodiment of the inventive concept, the quality of service (QoS) of communication is ensured and high performance on-chip network is realized which enables entirely efficient communication.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An operation method of an on-chip network device, the operation method comprising:
performing, by the on-chip network device, data communication switching networking in a first switching network mode;
switching, by the on-chip network device, from the first switching network mode to a second switching network mode in response to a massive data transmission request;
performing, by the on-chip network device, data communication switching networking in the second switching network mode that is different from the first switching network mode; and
switching, by the on-chip network device, from the second switching network mode to the first switching network mode, when the data communication switching networking in the second switching network mode is terminated,
wherein switching from the first switching network mode to the second switching network mode includes:
activating a circuit switching enable signal and generating a scheduling disable signal in response to the circuit switching enable signal; and
stopping scheduling for establishing a new communication path in response to the scheduling disable signal, and
wherein generating the scheduling disable signal includes:
inverting the circuit switching enable signal to generate an inverted version of the circuit switching enable signal; and
generating the scheduling disable signal in response to a scheduling request signal, a tail signal, and the inverted version of the circuit switching enable signal.

2. The operation method of claim 1, wherein the first switching network mode is a packet switching network mode.

3. The operation method of claim 2, wherein the second switching network mode is a circuit switching network mode.

4. The operation method of claim 1, wherein the on-chip network device has a star type on-chip network structure.

5. An operation method of an on-chip network device, the operation method comprising:
performing, by the on-chip network device, data communication switching networking in a packet switching network mode;
switching, by the on-chip network device, from the packet switching network mode to a circuit switching network mode in response to a massive data transmission request;
performing, by the on-chip network device, data communication switching networking in the circuit switching network mode that is different from the packet switching network mode; and
switching, by the on-chip network device, from the circuit switching network mode to the packet switching network mode, when the data communication switching networking in the circuit switching network mode is terminated,
wherein switching from the packet switching network mode to the circuit switching network mode includes:
activating a circuit switching enable signal and generating a scheduling disable signal in response to the circuit switching enable signal; and
stopping scheduling for establishing a new communication path in response to the scheduling disable signal, and
wherein generating the scheduling disable signal includes:

inverting the circuit switching enable signal to generate an inverted version of the circuit switching enable signal; and generating the scheduling disable signal in response to a scheduling request signal, a tail signal, and the inverted version of the circuit switching enable signal.

6. The operation method of claim 5, wherein when the packet switching network mode is switched to the circuit switching network mode, a circuit switching path is established, and a communication path that has been formed in the packet switching network mode is switched to a detour path that does not pass the circuit switching path.

* * * * *